(12) United States Patent
Kim et al.

(10) Patent No.: US 9,083,044 B2
(45) Date of Patent: Jul. 14, 2015

(54) METHOD FOR MANUFACTURING ANODE ACTIVE MATERIAL FOR LITHIUM SECONDARY BATTERY, ANODE ACTIVE MATERIAL FOR LITHIUM SECONDARY BATTERY MANUFACTURED THEREBY AND LITHIUM SECONDARY BATTERY USING SAME

(75) Inventors: Jik Soo Kim, Chungcheongbuk-do (KR); Moon Ho Choi, Chungcheongbuk-do (KR); Jong Ryeol Yu, Bucheon-si (KR); Dong Gui Hoi, Incheon (KR)

(73) Assignee: ECOPRO CO., LTD., Chungcheongbuk-do (KR)

( * ) Notice: Subject to any disclaimer, the term of this patent is extended or adjusted under 35 U.S.C. 154(b) by 391 days.

(21) Appl. No.: 13/811,170

(22) PCT Filed: Jul. 22, 2011

(86) PCT No.: PCT/KR2011/005445
§ 371 (c)(1),
(2), (4) Date: Mar. 28, 2013

(87) PCT Pub. No.: WO2012/011785
PCT Pub. Date: Jan. 26, 2012

(65) Prior Publication Data
US 2013/0183583 A1   Jul. 18, 2013

(30) Foreign Application Priority Data

Jul. 22, 2010   (KR) .......................... 10-2010-0070920

(51) Int. Cl.
*H01M 4/525* (2010.01)
*H01M 4/131* (2010.01)
*H01M 4/36* (2006.01)
*H01M 4/505* (2010.01)
*H01M 4/02* (2006.01)

(52) U.S. Cl.
CPC .............. *H01M 4/525* (2013.01); *H01M 4/131* (2013.01); *H01M 4/366* (2013.01); *H01M 4/505* (2013.01); *H01M 2004/021* (2013.01); *Y02E 60/122* (2013.01)

(58) Field of Classification Search
CPC ..... H01M 4/525; H01M 4/131; H01M 4/366; H01M 4/505; H01M 2004/021; H01M 2004/02; Y02E 60/122
See application file for complete search history.

(56) References Cited

U.S. PATENT DOCUMENTS

| | | | | |
|---|---|---|---|---|
| 5,783,333 | A | * | 7/1998 | Mayer ........................... 429/223 |
| 7,205,072 | B2 | * | 4/2007 | Kang et al. ............... 429/231.95 |
| 2004/0191161 | A1 | * | 9/2004 | Wang et al. ................. 423/594.2 |
| 2009/0162751 | A1 | * | 6/2009 | Honbo et al. .................. 429/223 |

FOREIGN PATENT DOCUMENTS

| | | |
|---|---|---|
| JP | 2008251532 A | 10/2008 |
| KR | 100261508 B1 | 7/2000 |
| KR | 1020030093166 A | 12/2003 |
| KR | 1020060128814 A | 12/2006 |
| KR | 100959589 B1 | 5/2010 |

OTHER PUBLICATIONS

International Search Report of PCT/KR2011/005445, dated Apr. 2, 2012, 2 pages.

* cited by examiner

*Primary Examiner* — Raymond Alejandro
(74) *Attorney, Agent, or Firm* — Lucas & Mercanti, LLP (57) ABSTRACT

The present invention provides a method for manufacturing an anode active material for a lithium secondary battery comprising the following steps of:
a) simultaneously mixing a first metallic salt aqueous solution including nickel, cobalt, manganese and optionally a transition metal, a chelating agent, and a basic aqueous solution in a reactor, and mixing with a lithium raw material and calcining to manufacture a center part including the compound of following Chemical Formula 1:

$$Li_{x1}[Ni_{1-y1-z1-w1}Co_{y1}Mn_{z1}M_{w1}]O_2 \quad \text{Chemical Formula 1}$$

(wherein, $0.9 \leq x_1 \leq 1.3$, $0.1 \leq y_1 \leq 0.3$, $0.0 \leq z_1 \leq 0.3$, $0 \leq w_1 \leq 0.1$, and M is at least one metal selected from the group consisting of Mg, Zn, Ca, Sr, Cu, Zr, P, Fe, Al, Ga, In, Cr, Ge, and Sn);

b) simultaneously mixing a second metallic salt aqueous solution including nickel, cobalt, manganese and optionally a transition metal, the chelating agent, and the basic aqueous solution in a reactor, mixing with the lithium raw material and calcining, and grinding thereof to the size of nanometers to manufacture a compound for forming an outer part including the compound of following Chemical Formula 2:

$$Li_{x2}[Ni_{1-y2-z2-w2}Co_{y2}Mn_{z2}M_{w2}]O_2 \quad \text{Chemical Formula 2}$$

(wherein, $0.9 \leq x_2 \leq 1+z_2$, $0 \leq y_2 \leq 0.33$, $0 \leq z_2 \leq 0.5$, $0 \leq w_2 \leq 0.1$ and M is at least one metal selected from the group consisting of Mg, Zn, Ca, Sr, Cu, Zr, P, Fe, Al, Ga, In, Cr, Ge, and Sn);

c) mixing the center part manufactured from step a) and the compound for forming the outer part manufactured from step b) to form the outer part on the center part surface; and d) heat-treating the compound obtained from step c) at 500-800° C. to form a bi-layer structure in which lithium is present at a continuous concentration-gradient from the contact interface of the center part and the outer part to the surface part of the outer part, and an anode active material for a lithium secondary battery manufactured thereby.

7 Claims, 7 Drawing Sheets

METHOD FOR MANUFACTURING ANODE ACTIVE MATERIAL FOR LITHIUM SECONDARY BATTERY, ANODE ACTIVE MATERIAL FOR LITHIUM SECONDARY BATTERY MANUFACTURED THEREBY AND LITHIUM SECONDARY BATTERY USING SAME

CROSS-REFERENCE TO RELATED APPLICATIONS

This application is a 371 of PCT/KR2011/005445 filed on Jul. 22, 2011, which claims the benefit of Korean Patent Application No. 10-2010-0070920 filed on Jul. 22, 2010, the entire contents of each of which are incorporated herein by reference.

FIELD OF THE INVENTION

The present invention relates to a method for manufacturing an anode active material for a lithium secondary battery, an anode active material for a lithium secondary battery manufactured thereby, and a lithium secondary battery using the same, particularly to a method for manufacturing an anode active material for a lithium secondary battery embodying a continuous concentration-gradient structure wherein the lithium concentration is gradually reduced from the outside of a particle to the inside thereof; an anode active material for a lithium secondary battery manufactured thereby; and a lithium secondary battery using the same.

BACKGROUND OF THE INVENTION

Lithium secondary batteries have been widely used as a power source of portable devices since its appearance in 1991's. Recently, according to rapid development of electronics, communications, and computer industries, their application is spreading into camcorders, mobile phones, notebook computers, PCs and the like and development therefor is being intensive more and more. As a power source for driving the portable electronic data communication devices, demands for the lithium secondary batteries are increasing day by day. Particularly, researches about a power source for an electric vehicle, wherein an internal-combustion engine and a lithium secondary battery are hybridized, are actively proceeding in America, Japan, Europe and the like.

As a large battery for electric vehicles, a nickel-hydrogen battery, whose development is still in the beginning step, has been used in the view of stability, but the use of a lithium ion battery has been considered in the view of energy density. But the biggest challenge is high cost and safety. Particularly, the anode active materials such as $LiCoO_2$ and $LiNiO_2$, which have already been commercialized, have defects that the crystal structure becomes instable by delithiation during charging, and therefore, thermal stability also becomes very poor.

Small lithium ion secondary batteries now sold on the market use $LiCoO_2$ as an anode active material. The $LiCoO_2$ is an excellent material having stable charge/discharge characteristics, excellent electric conductivity, high stability and even discharge voltage, but because Co has low deposit and is expensive and toxic to human body, development of other anode materials is needed. $LiNiO_2$ having the layered structure like $LiCoO_2$ shows large discharge capacity, but it has not been commercialized yet because it has low cycle life and stability problem at higher temperature and is the most thermally unstable.

In order to improve the problems, there have been many attempts to replace the part of the nickel with transition metal atoms. However, satisfactory results have not been obtained yet. For example, Japanese Laid-Open Patent Publication No. Hei 8-171910 disclosed a method in which Mn and Ni are coprecipitated by adding an alkaline solution into an aqueous solution mixture of Mn and Ni, then lithium hydroxide is added and the resulting mixture is calcined to obtain an anode active material represented by the formula $LiNi_xMn_{1-x}O_2$ ($0.7 \leq x \leq 0.95$).

Recently, Japanese Patent Application No. 2000-227858 disclosed an anode active material prepared by a novel technology about uniformly distributing Mn and Ni compounds in atomic level to form a solid solution, not the technology partly substituting $LiNiO_2$ or $LiMnO_2$ with transition metals. However, due to reactivity of $Ni^{4+}$, it is difficult to be commercialized and the thermal stability problem of the active material comprising Ni has not been solved yet.

As the most highlighted substitute materials for $LiCoO_2$ having a layered crystal structure, there are $Li[Ni_{1/2}Mn_{1/2}]O_2$ and $Li[Ni_{1/3}Co_{1/3}Mn_{1/3}]O_2$ and the like, in which nickel-manganese and nickel-cobalt-manganese are mixed at a ratio of 1:1 or 1:1:1, respectively. These materials show lower cost, higher capacity and better thermal stability than $LiCoO_2$. However, their high-rate and low-temperature characteristics become lower due to their lower electric conductivity than $LiCoO_2$, and energy density of a battery is not improved in spite of high capacity due to their low tap density. Particularly, due to their low electronic conductivity (J. of Power Sources, 112 (2002) 41-48), their high power property as a hybrid power source for electric vehicles is lower than $LiCoO_2$, $LiNiO_2$ and $LiMn_2O_4$.

In conclusion, as lithium transition metal-based oxides having Rm-type layered crystal structure, there are $LiCoO_2$, $LiNiO_2$, $LiNi_{1-x}Co_xO_2$, $LiNi_{1-x-y}Co_xM_yO_2$ (M=Mn, Al, Mg, Ti, $Ti_{1/2}$—$Mg_{1/2}$), $LiNi_{1/3}Co_{1/3}Mn_{1/3}O_2$, $LiNi_{1/2}Mn_{1/2}O_2$, $LiNi_xCo_{1-2x}MnxO_2$, $Li_{1+z}[Ni_xCo_{1-2x}Mnx]_{1-z}O_2$ and the like. Generally, in these materials, the composition on the particle surface is identical with the composition inside the particle. In order to have excellent anode performance, the function inside of the anode powder particles and the function on the surface thereof should be different each other. Namely, the composition inside the particle should have many insertion/extraction sites and be structurally stable, but it should minimize reactivity with an electrolyte solution on the particle surface.

There is a surface-coating method as a method changing the surface composition of the anode active material. Generally, it is known that the amount of coating is very small of 1 to 2 weight % or less based on an anode active material, and the coating layer forms a very thin membrane layer of about several nanometers to prevent side reaction with an electrolyte. Or, sometimes, when the heat-treating temperature after coating is too high, a solid solution is formed on the surface of the powder particles and the metal composition is different with the composition inside the particle. In this case, the thickness of the surface layer bound to the coating material is several nanometers or less, and there is a dramatic difference between the coating layer and the particle bulk. Therefore, after long-term use of hundreds of cycles, the effect becomes lower. Further, the effect is halved by incomplete coating, namely, non-uniform distribution of the coating layer on the surface.

In order to correct the defects, lithium transition metal oxides having concentration-gradient of metal composition, which were manufactured by a method of synthesizing a previous inner material, coating a material having different composition outside thereof to prepare a bi-layer, and mixing with lithium salts followed by heat-treating thereof, have been suggested. For example, Korean Patent Publication No. 2005-0083869 disclosed that through a heat-treating process, gradual concentration-gradient of the metal composition could be obtained, but difference in the concentration-gradient was hardly formed at high heat-treating temperature of 850° C. or more due to thermal diffusion of the metal ions. Further, because the powder synthesized by this invention had low tapped density, it was not enough to be used as an anode active material for a lithium secondary battery. Further, in this method, when the lithium transition metal oxide was used as an internal material, reproducibility was reduced due to difficulty in controlling the amount of lithium on the outmost layer. When the lithium is excessively synthesized, lithium carbonates and lithium hydroxides are remained on the surface. Accordingly, a lot of gases are produced at high temperature when assembling a cell and hereby cell cases can be easily swollen, gelation can be easily occurred when mixing the electrode for the cell assembly, and aggregation can be occurred when coating the electrode and hereby surface defect can be generated.

SUMMARY OF THE INVENTION

In order to solve the above-described problems associated with prior art, the present invention is objected to provide a method for manufacturing an anode active material for a lithium secondary battery having thermal stability, high capacity and excellent lifespan by embodying a continuous concentration-gradient structure wherein the lithium concentration against the concentration of metal atoms is gradually reduced from the outside of a particle to the inside thereof; an anode active material for a lithium secondary battery manufactured thereby; and a lithium secondary battery using the same.

In order to accomplish one object of the present invention, the present invention provides a method for manufacturing an anode active material for a lithium secondary battery comprising the following steps of:

a) simultaneously mixing a first metallic salt aqueous solution including nickel, cobalt, manganese and optionally a transition metal, a chelating agent, and a basic aqueous solution in a reactor, and mixing with a lithium raw material and calcining to manufacture a center part including the compound of following Chemical Formula 1:

Chemical Formula 1

(wherein, $0.9 \leq x_1 \leq 1.3$, $0.1 \leq y_1 \leq 0.3$, $0.0 \leq z_1 \leq 0.3$, $0 \leq w_1 \leq 0.1$, and M is at least one metal selected from the group consisting of Mg, Zn, Ca, Sr, Cu, Zr, P, Fe, Al, Ga, In, Cr, Ge, and Sn);

b) simultaneously mixing a second metallic salt aqueous solution including nickel, cobalt, manganese and optionally a transition metal, a chelating agent, and a basic aqueous solution in a reactor, mixing with the lithium raw material and calcining, and grinding thereof to the size of nanometers to manufacture a compound for forming an outer part including the compound of following Chemical Formula 2:

Chemical Formula 2

(wherein, $0.9 \leq x_2 \leq 1+z_2$, $0 \leq y_2 \leq 0.33$, $0 \leq z_2 \leq 0.5$, $0 \leq w_2 \leq 0.1$ and M is at least one metal selected from the group consisting of Mg, Zn, Ca, Sr, Cu, Zr, P, Fe, Al, Ga, In, Cr, Ge, and Sn);

c) mixing the center part manufactured from step a) and the compound for forming the outer part manufactured from step b) to form the outer part on the center part surface; and d) heat-treating the compound obtained from step c) at 500-800° C. to form a bi-layered structure, in which lithium is present at a continuous concentration-gradient from the contact interface of the center part and the outer part to the surface part of the outer part.

The present invention is characterized that average particle diameter of the center part in step a) is 3 to 20 μm.

The present invention is characterized that average particle diameter of the compound for forming an outer part in step b) is 20 to 600 nm.

The present invention is characterized that the thickness of the outer part formed on the center part surface in steps c) and d) is 0.5 to 5 μm.

Further, the present invention provides an anode active material for a lithium secondary battery manufactured by any method of the methods described above, wherein lithium is present at a continuous concentration-gradient from the contact interface of the center part and the outer part to the surface part of the outer part.

Further, the anode active material for a lithium secondary battery manufactured by any method of the methods described above, wherein relation between D and P satisfies the following formula, when D is distance to a certain point in the outer part based on the surface part of the outer part, and P is concentration ratio of lithium to concentration of metal atoms at position D when D is changed from the surface part of the outer part to the contact interface of the center part and the outer part:

$$P = aD + b;$$

D=Distance to a certain point in the outer part based on the surface part of the outer part;

P=Concentration ratio of lithium to concentration of metal atoms at position D; and $0.07 \leq a \leq 0.7$, $0.95 \leq b \leq 1.05$.

Further, the present invention provides a lithium secondary battery using the anode active material for a lithium secondary battery described above.

ADVANTAGEOUS EFFECTS OF THE INVENTION

The method for manufacturing an anode active material for a lithium secondary battery of the present invention and the anode active material for a lithium secondary battery manufactured thereby having a concentration-gradient bi-layered structure, wherein lithium concentration is gradually increased from the outmost part to the inside, has thermal stability and excellent lifespan as well as high capacity, so as to be used to large batteries for electric vehicles and power storage systems as well as small secondary batteries.

BRIEF DESCRIPTION OF DRAWINGS

The above and other objects and features of the present invention will become apparent from the following description of the invention taken in conjunction with the following accompanying drawings, which respectively show.

DETAILED DESCRIPTION OF THE INVENTION

Hereinafter, the preferred embodiments of the present invention now will be described in detail with reference to the accompanying drawings to make those skilled in the art embody the present invention easily.

The present invention provides a method for manufacturing an anode active material for a lithium secondary battery comprising the following steps of: a) simultaneously mixing a first metallic salt aqueous solution including nickel, cobalt, manganese and optionally a transition metal, a chelating agent, and a basic aqueous solution in a reactor, and mixing with a lithium raw material and calcining to manufacture a center part; b) simultaneously mixing a second metallic salt aqueous solution including nickel, cobalt, manganese and optionally a transition metal, the chelating agent, and the basic aqueous solution in a reactor, mixing with the lithium raw material and calcining, and grinding thereof to the size of nanometers to manufacture a compound for forming an outer part; c) mixing the center part manufactured from step a) and the compound for forming the outer part manufactured from step b) to form the outer part on the center part surface; and d) heat-treating the compound obtained from step c) at 500-800° C. to form a bi-layered structure in which lithium is present at a continuous concentration-gradient from the contact interface of the center part and the outer part to the surface part of the outer part.

First of all, a) the first metallic salt aqueous solution including nickel, cobalt, manganese and optionally a transition metal, the chelating agent, and the basic aqueous solution are simultaneously mixed in a reactor, and then mixed with the lithium raw material and calcined to manufacture the center part.

More specifically, first of all, in order to manufacture a composite metal hydroxide precipitate as a precursor, the first metallic salt aqueous solution including nickel, cobalt, manganese and optionally a transition metal, the chelating agent, and the basic aqueous solution are simultaneously mixed in a reactor. The first metallic salt aqueous solution can be prepared by adding nickel salts, cobalt salts, manganese salts and salts containing transition metals to a solvent, or it may comprise each of nickel salts; cobalt salts; manganese salts; and at least one atom selected from the group consisting of Mg, Zn, Ca, Sr, Cu, Zr, P, Fe, Al, Ga, In, Cr, Ge, Sn and the combination thereof.

The metallic salt may be any water-soluble salt such as sulfate, nitrate, acetate, halide and hydroxide, but not particularly limited thereto. Further, the first metallic salt aqueous solution can be prepared by mixing nickel, cobalt, manganese and transition metals by controlling molar ratio thereof so as to have high capacity. This molar ratio can be easily calculated according to the desired final metal composition of the center part. In the present invention, when $1-y_1-z_1-w_1$, $y_1$, $z_1$ and $w_1$ express a ratio of nickel, cobalt, manganese and transition metal M, respectively, $x_1$, $y_1$, $z_1$ and $w_1$ satisfy $0.9 \leq x_1 \leq 1.3$, $0.1 \leq y_1 \leq 0.3$, $0.0 \leq z_1 \leq 0.3$ and $0 \leq w_1 \leq 0.1$, and the ratio of nickel, cobalt and manganese may be, for example, 3:1:6, 4:1:5, 4:0:6 and the like.

The chelating agent may be aqueous ammonia solution, aqueous ammonium sulfate solution, a mixture thereof and the like. Molar ratio of the chelating agent and the first metallic salt aqueous solution may be preferably 0.2 to 0.5:1, more preferably, 0.2 to 0.4:1. The molar ratio of the chelating agent to 1 mole of the first metallic salt aqueous solution is set to 0.2 to 0.5 because the chelating agent forms complex by reacting with the metal to the ratio of 1:1 or more, but the chelating agent remained after the reaction of the complex with the basic aqueous solution such as NaOH can be changed to an intermediate product and then be recovered and used as a chelating agent. Further, this is the optimum condition to increase crystallinity of the anode active material and stabilize the material.

The basic aqueous solution may be any common aqueous solution showing basicity such as NaOH and KOH, but not limited thereto. The basic aqueous solution can be used at a concentration of 4 M to 5 M, preferably.

Hereinafter, the reaction of the manufacturing step of the composite metal hydroxide precipitate will be described in detail. The nickel salt, the manganese salt, the cobalt salt and optionally the transition metallic salt are dissolved in distilled water followed by adding together with the chelating agent and the basic aqueous solution, respectively, to a reactor to make precipitation. Coprecipitation is a method precipitating two or more atoms in an aqueous solution at the same time using neutralization reaction to obtain composite hydroxide. Herein, average retention time of the mixed solution in the reactor is controlled to 4 to 12 hours, pH is controlled to 10 to 12.5, preferably, to 10.5 to 11.5, and temperature of the reactor is maintained at 50° C. to 80° C. The temperature of the reactor is increased because it is difficult to obtain high density composite hydroxide due to precipitation of the formed cobalt hydroxide as a form of complex at lower temperature. The reaction time in the reactor can be controlled to 8 to 30 hours, preferably, 10 to 30 hours. The first metal hydroxide precipitate prepared by the said method is collected as a form of slurry, and then the slurry solution is filtered and washed followed by drying at 100 to 150° C. to obtain the composite metal hydroxide.

The dried composite metal hydroxide and the lithium raw material are mixed at a certain ratio and calcined at 900 to 1,000° C. under air flow to obtain the lithium composite metal oxide. The lithium raw material may be any lithium salt comprising lithium such as lithium carbonate and lithium nitrate, but not limited thereto.

In the present invention, the ratio of the composite metal oxide and the lithium salt may be preferably 1:1.1 to 1:1.5. When the lithium is excessively formed and remained on the surface of the anode active material, there may be problems of swelling of the cell case, the surface defect and the like. Therefore, the problems can be minimized by arranging more lithium outside of the anode active material particles than inside thereof.

The lithium composite metal oxide obtained as described above becomes a "center part", which is positioned in the center of the anode active material, and can be expressed by the following Chemical Formula 1:

$$Li_{x1}[Ni_{1-y1-z1-w1}Co_{y1}Mn_{z1}M_{w1}]O_2 \quad \text{Chemical Formula 1}$$

(wherein, $0.9 \leq x_1 \leq 1.3$, $0.1 \leq y_1 \leq 0.3$, $0.0 \leq z_1 \leq 0.3$, $0 \leq w_1 \leq 0.1$, and M is at least one metal selected from the group consisting of Mg, Zn, Ca, Sr, Cu, Zr, P, Fe, Al, Ga, In, Cr, Ge, and Sn).

Preferably, average particle diameter of the center part is 3 to 20 μm, more preferably, 5 to 15 μm. If the average particle diameter of the center part is less than 3 μm, discharge capacity may be decreased, and if it is more than 20 μm, thermal stability may be decreased.

The center part manufactured by the above method has high capacity and high energy density as well as excellent thermal stability and can maintain high voltage.

Then, b) a compound for forming an outer part is manufactured by simultaneously mixing a second metallic salt aqueous solution including nickel, cobalt, manganese and optionally a transition metal, the chelating agent, and the basic aqueous solution in the reactor, mixing with the lithium raw material and calcining, and grinding thereof to the size of nanometers.

First of all, in order to manufacture a composite metal hydroxide precipitate as a precursor, the second metallic salt aqueous solution including nickel, cobalt, manganese and optionally a transition metal, the chelating agent, and the basic aqueous solution are mixed in the reactor. The second metallic salt aqueous solution can be prepared by adding nickel salts, cobalt salts, manganese salts and salts containing transition metals to a solvent, or it may comprise each of nickel salts; cobalt salts; manganese salts; and at least one atom selected from the group consisting of Mg, Zn, Ca, Sr, Cu, Zr, P, Fe, Al, Ga, In, Cr, Ge, Sn and the combination thereof.

The metallic salt may be any water-soluble salt such as sulfate, nitrate, acetate, halide and hydroxide, but not particularly limited thereto. Further, the second metallic salt aqueous solution can be prepared by mixing nickel, cobalt, manganese and transition metals by controlling molar ratio thereof so as to have high capacity. This molar ratio can be easily calculated according to the desired final metal composition of the center part. In the present invention, when $1-y_2-z_2-w_2$, $y_2$, $z_2$ and $w_2$ express a ratio of nickel, cobalt, manganese and transition metal M, respectively, $X_2$, $y_2$, $z_2$ and $w_2$ satisfy $0.9 \leq x_2 \leq 1+z_2$, $0 \leq y_2 \leq 0.33$, $0 \leq z_2 \leq 0.5$ and $0 \leq w_2 \leq 0.1$, and the ratio of nickel, cobalt and manganese may be, for example, 1:1:1, 5:2:3 and the like.

The kinds and the amounts of the chelating agent and the basic aqueous solution are identical with those used in the method for manufacturing the center part.

The composite metal oxide dried by the method same with the method manufacturing the center part and the lithium raw material are mixed at a certain ratio and calcined at 900 to 1,000° C. under air flow to obtain the lithium composite metal oxide. The lithium raw material may be any lithium salt comprising lithium such as lithium carbonate and lithium nitrate, but not limited thereto.

In the present invention, the ratio of the composite metal oxide and the lithium salt may be preferably 1:0.6 to 1:1.1. For the aforementioned reason, smaller amount of lithium is contained at the outer part of the anode active material particle than the center part, namely, the amount is less than 1.1, which is smaller than the center part, to form concentration-gradient in which lithium is continuously reduced from the contact interface of the center part and the outer part to the surface part of the outer part.

The lithium composite metal oxide obtained as described above is ground to the size of several nanometers using an air jet-mill. When the particles are ground to average particle diameter of several nm, electric conductivity can be improved.

Because the obtained lithium composite metal oxide becomes a raw material for forming the outer part located at the outer wall of the anode active material, it is named a "compound for forming the outer part". Average particle diameter of the compound for forming the outer part is preferably 20 to 600 nm, more preferably 30 to 500 nm. When the average particle diameter is within the said range, preferable coating thickness can be obtained when coating the center part.

The compound for forming the outer part can be expressed by the following Chemical Formula 2:

$$Li_{x2}[Ni_{1-y2-z2-w2}Co_{y2}Mn_{z2}M_{w2}]O_2 \quad \text{Chemical Formula 2}$$

(wherein, $0.9 \leq x_2 \leq 1+z_2$, $0 \leq y_2 \leq 0.33$, $0 \leq z_2 \leq 0.5$, $0 \leq w_2 \leq 0.1$ and M is at least one metal selected from the group consisting of Mg, Zn, Ca, Sr, Cu, Zr, P, Fe, Al, Ga, In, Cr, Ge, and Sn).

Then, c) the outer part is formed on the center part surface by mixing the center part obtained from step a) and the compound for forming the outer part obtained from step b), and then d) a bi-layered structure, in which lithium is present at a continuous concentration-gradient from the contact interface of the center part and the outer part to the surface part of the outer part, is formed by heat-treating the compound thus at 500-800° C.

In this step, the center part obtained from step a) and the compound for forming the outer part obtained from step b) are put into a high speed dry coating machine together and are mixed at the rate of 5,000 to 15,000 rpm. At this time, the compounds for forming the outer part having the size of several nanometers surround the center part to a certain thickness and coating to form the outer part.

The thickness of the outer part coating the center part can be controlled by controlling retention time, temperature and rotation speed in the reactor such as the high speed dry coating machine. The thickness of the outer part formed in the present invention may be preferably 0.5 to 5 μm, more preferably 1 to 3 μm. When the thickness of the outer part is within the said range, it is preferred because thermal stability is improved, but when it is out of the said range, it is not preferred because discharge capacity is reduced.

The obtained bi-layered structure was heat-treated at 500 to 800° C. to obtain a bi-layered structure, in which lithium is present at a continuous concentration-gradient from the contact interface of the center part and the outer part coated on the surface of the center part to the surface part of the outer part. The heat-treatment atmosphere is preferably air atmosphere or oxidative atmosphere of oxygen, and the time is preferably 10 to 30 hours. Before the heat-treatment process, a pre-calcination can be conducted by maintaining at 250 to 650° C. for 5 to 20 hours. Further, after the heat-treatment process, an annealing process can be conducted at 600 to 750° C. for 10 to 20 hours.

In the present invention, "present at a continuous concentration-gradient" means that the concentration of metal is gradually changed as concentration distribution. The concentration distribution is continuously embodied from the outmost part of the center part inside the anode active material to the surface part of the outer part.

The continuous concentration-gradient can prevent generation of impurity phase, which can be generated by drastic difference of the compositions of transition metal and lithium on the contact interface of the center part and the outer part, and can stabilize crystal structure because sharp phase boundary region is not appeared.

In the present invention, the anode active material for a lithium secondary battery, wherein relation between D and P satisfies the following formula, when D is distance to a certain point in the outer part based on the surface part of the outer part, and P is concentration ratio of lithium to concentration of metal atoms at position D when D is changed from the surface part of the outer part to the contact interface of the center part and the outer part:

$$P = aD + b;$$

D = Distance to a certain point in the outer part based on the surface part of the outer part;
P = Concentration ratio of lithium to concentration of metal atoms at position D; and
$0.07 \leq a \leq 0.7$, $0.95 \leq b \leq 1.05$.

Namely, the lithium concentration against the concentration of the metal atoms increases from the surface of the outer part to the inside. However, when the a is less than 0.07, the lithium concentrations of the center part and the outer part are almost same, and hereby the lithium concentration at the outer part against the concentration of the metal atoms is high. Accordingly, there may be the problems of when lithium is excessively formed and remained. And when the a is more than 0.7, it may be structurally unstable due to rapid change of the lithium concentration at the center part and the outer part.

The anode active material for a lithium secondary battery manufactured by the said method, in which lithium is present at a continuous concentration-gradient from the contact interface of the center part and the outer part to the surface part of the outer part, entirely has thermal stability, high capacity and excellent lifespan by maintaining high capacity, high energy density, thermal stability and high voltage characteristics at the center part and minimizing the excessive lithium problem, which is a defect of the center part material, at the outer part at the same time.

Further, the present invention provides a lithium secondary battery, which is characterized by using the anode active material for a lithium secondary battery according to the present invention.

An electrolyte, which can be used for the lithium secondary battery, may be esters, for example, cyclic carbonate such as ethylene carbonate (EC), propylene carbonate (PC), butylene carbonate (BC) and vinylene carbonate (VC); non-cyclic carbonate such as dimethyl carbonate (DMC), diethyl carbonate (DEC), ethyl methyl carbonate (EMC) and dipropyl carbonate (DPC); aliphatic carbonic acid ester such as methyl formate (MF), methyl acetate (MA), methyl propionate (MP) and ethyl propionate (EP); and carbonic acid ester such as gamma-butyrolactone (GBL). The cyclic carbonate may be preferably ethylene carbonate (EC), propylene carbonate (PC) and vinylene carbonate (VC). Further, when necessary, it is preferred to use the aliphatic carbonic acid ester at an amount of 20% or less.

A lithium salt dissolved in the solvent may be $LiClO_4$, $LiBF_4$, $LiPF_6$, $LiAlCl_4$, $LiSbF_6$, $LiSCN$, $LiCF_3SO_3$, $LiCF_3CO_2$, $Li(CF_3SO_2)_2$, $LiAsF_6$, $LiN(CF3SO_2)_2$, $LiB_{10}Cl_{10}$, LiBOB (Lithium bis(oxalato)borate), lower aliphatic lithium carbonate, lithium chloroborate, lithium tetraphenylborate, and imides such as $LiN(CF_3SO_2)(C_2F_5SO_2)$, $LiN(CF_3SO_2)_2$, $LiN(C_2F_5SO_2)_2$, $LiN(CF_3SO_2)(C_4F_9SO_2)$. The lithium salt can be used alone or in any combination thereof within the scope that does not impair the effect of the present invention. Particularly, $LiPF_6$ is preferred.

Further, in order to make the electrolyte incombustible, carbon tetrachloride, trifluoro ethylene chloride, phosphate containing phosphorus and the like can be added to the electrolyte.

In addition, the following solid electrolytes also can be used. As an inorganic solid electrolyte, $Li_4SiO_4$, $Li_4SiO_4$—LiI-LiOH, $xLi_3PO_4$-$(1-x)Li_4SiO_4$, $Li_2SiS_3$, $Li_3PO_4$—$Li_2S$—$SiS_2$, phosphorus sulfide and the like can be preferably used.

As an organic solid electrolyte, a polymer material such as polyethylene oxide, polypropylene oxide, polyvinyl alcohol, polyfluorovinyllidene, fluoropropylene and the like, a derivative thereof, a mixture thereof, a complex thereof, and the like can be preferably used.

A separator may be preferably polyethylene-based or polypropylene-based polymer such as porous polyethylene.

As a cathode material, lithium, a compound, which can adsorb or release a lithium ion, such as lithium alloy, alloy, intermetallic compound, carbon, organic compound, inorganic compound, metal complex and organic polymer compound and the like can be used. The compound can be used alone or in any combination thereof within the scope that does not impair the effect of the present invention.

As the lithium alloy, Li—Al-based alloy, Li—Al—Mn-based alloy, Li—Al—Mg-based alloy, Li—Al—Sn-based alloy, Li—Al—In-based alloy, Li—Al—Cd-based alloy, Li—Al—Te-based alloy, Li—Ga-based alloy, Li—Cd-based alloy, Li—In-based alloy, Li—Pb-based alloy, Li—Bi-based alloy, Li—Mg-based alloy and the like can be preferably used.

As the alloy and the intermetallic compound, a compound of a transition metal and silicon, a compound of a transition metal and tin, and the like can be used, and particularly, a compound of nickel and silicon is preferred.

As the carboneous material, coke, pyrolytic carbons, natural graphite, artificial graphite, meso carbon micro beads, graphitized meso phase spheres, gas phase grown carbon, vitrified carbons, carbon fiber (polyacrylonitrile-type, pitch-type, cellulose-type and gas phase grown carbon-type), amorphous carbon, carbons obtained by baking organic materials and the like can be preferably used. These can be used alone or in any combination thereof within the scope that does not impair the effect of the present invention.

Further, as a case, metal can or a packaging material made of aluminum and several polymer layers can be preferably used.

Hereinafter, the present invention is explained by the following examples in more detail. The following examples are intended to further illustrate the present invention, and the scope of the present invention cannot be limited thereby in any way.

EXAMPLE 1

Bi-Layered Structure, not Treated by Heat

1. Synthesis of Center Part 2.5 M Nickel sulfate 6-hydrate ($NiSO_4.6H_2O$) and cobalt sulfate 7-hydrate ($CoSO_4.7H_2O$) and manganese sulfate monohydrate ($MnSO_4.H_2O$) were mixed to obtain a mixed metal solution having Ni:Co:Mn molar ratio of 28:12:60. At this time, a continuous reactor of internal volume of 90 L filled with 1 M aqueous ammonia solution was used, and pH of the initial solution was in a range of 11~12. The prepared 2.5 M nickel/cobalt/manganese mixed metal solution and 28% ammonia water and 25% sodium hydroxide solution were stirred at 500 rpm while inserting nitrogen and continuously inserted using a metering pump at the same time. At this time, a continuous reaction was conducted by keeping the temperature in the reactor at 50° C., by inserting the mixed metal solution and the ammonia water at the rate of 7 L/hr and 1.0 L/hr, respectively, and by controlling the amount of the sodium hydroxide to maintain the pH of 11~12. The retention time in the reactor was 10 hours. Slurry as a product of the continuous reaction, which was released through reactor over flow was collected. The collected slurry solution was filtered and washed with highly pure distilled water followed by drying in a vacuum oven of 110° C. for 12 hours to obtain a precursor, nickel/cobalt/manganese composite metal hydroxide. The composition of the obtained composite metal hydroxide was $Ni_{0.28}Co_{0.12}Mn_{0.60}(OH)_2$.

The dried composite metal hydroxide was mixed with lithium carbonate ($Li_2CO_3$) at the ratio of Li/(Ni+Co+Mn)=1.25, and then put into a Cordilite melting pot (Sega) followed by calcining at 950° C. and for 10 hours under air flow to obtain a lithium composite metal oxide. The composition of the calcined lithium composite metal oxide was $Li_{1.25}[Ni_{0.21}Co_{0.09}Mn_{0.45}]O_2$.

2. Synthesis of Compound for Forming Outer Part 2.5 M Nickel sulfate 6-hydrate ($NiSO_4 \cdot 6H_2O$) and cobalt sulfate 7-hydrate ($CoSO_4 \cdot 7H_2O$) and manganese sulfate monohydrate ($MnSO_4 \cdot H_2O$) were mixed to obtain a mixed metal solution having Ni:Co:Mn molar ratio of 33.3:33.3:33.3. At this time, a continuous reactor of internal volume of 90 L filled with 1 M ammonia aqueous solution was used, and pH of the initial solution was in a range of 11~12. The prepared 2.5 M nickel/cobalt/manganese mixed metal solution and 28% ammonia water and 25% sodium hydroxide solution were stirred at 500 rpm while inserting nitrogen and continuously inserted using a metering pump at the same time. At this time, a continuous reaction was conducted by keeping the temperature in the reactor at 50° C., by inserting the mixed metal solution and the ammonia water at the rate of 7 L/hr and 0.4 L/hr, respectively, and by controlling the amount of the sodium hydroxide to maintain the pH of 11~12. The retention time in the reactor was 10 hours. Slurry as a product of the continuous reaction, which was released through reactor over flow was collected. The collected slurry solution was filtered and washed with highly pure distilled water followed by drying in a vacuum oven of 110° C. for 12 hours to nickel/cobalt/manganese composite metal hydroxide. The composition of the obtained composite metal hydroxide was $Ni_{0.333}Cu_{0.333}Mn_{0.333}(OH)_2$.

The dried composite metal hydroxide was mixed with lithium carbonate ($Li_2CO_3$) at the ratio of Li/(Ni+Co+Mn)=1.0, and then put into a Cordilite melting pot (Sega) followed by calcining at 950° C. and for 10 hours under air flow to obtain a lithium composite metal oxide. The obtained calcined material was ground to the size of nanometers by using an air jet-mill to obtain a lithium composite metal oxide having the size of 100 nm or less, a layered structure and the composition of $Li[Ni_{0.333}Co_{0.333}Mn_{0.333}]O_2$.

3. Synthesis of Bi-Layered Structure

The center part and the compound for forming the outer part synthesized as described above were put into a high speed dry-type coating machine at a ratio of 80:20 and then mixed at a rotation speed of 10,000 rpm to obtain a bi-layered structure.

EXAMPLE 2

Heat-Treated Bi-Layered Structure

The bi-layered structure material synthesized in Example 1 was heat-treated at 600° C. for 2 hours under air atmosphere.

COMPARATIVE EXAMPLE 1

The method of 1. Synthesis of Center Part of Example 1 was repeated to obtain lithium composite metal oxide $Li_{1.25}[Ni_{0.21}Co_{0.09}Mn_{0.45}]O_2$.

COMPARATIVE EXAMPLE 2

The method of 2. Synthesis of Outer Part of Example 1 was repeated to obtain lithium composite metal oxide $Li[Ni_{0.333}CO_{0.333}Mn_{0.333}]O_2$ having a layered structure.

TEST EXAMPLE 1

XRD Measurement

Figure 1:
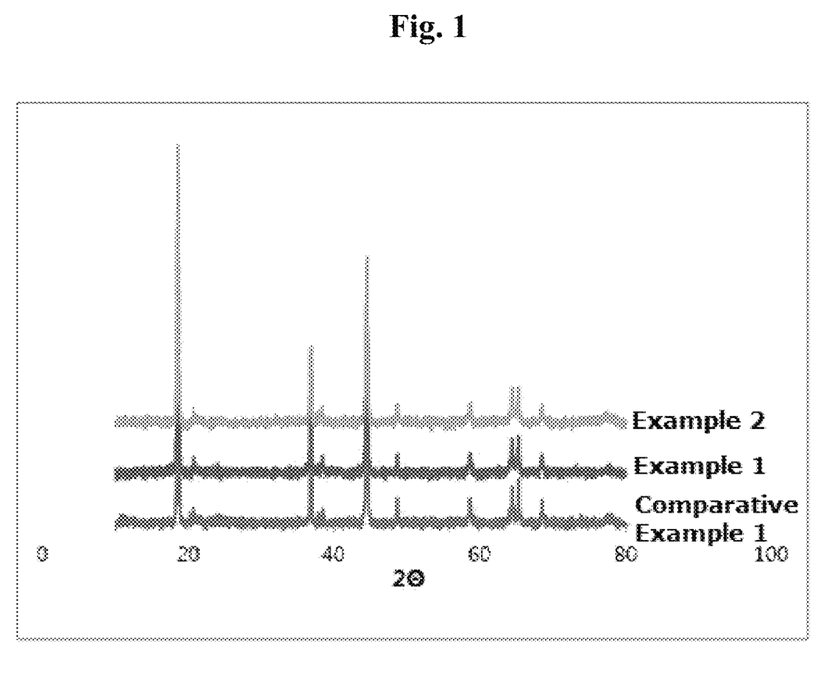
FIG. 1: a graph showing the result of powder XRD (X-Ray Diffraction) analysis for crystal structures of lithium composite metal oxides manufactured in Examples 1 and 2 and Comparative Example 1.
Figure 2:
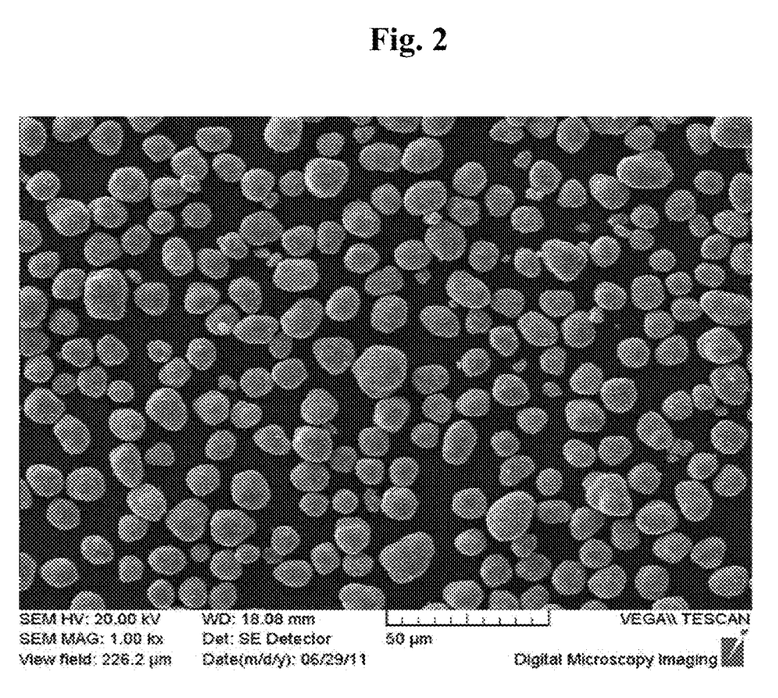
FIGS. 2 to 5: SEM images of particles according to Examples of the present invention.
Figure 3:
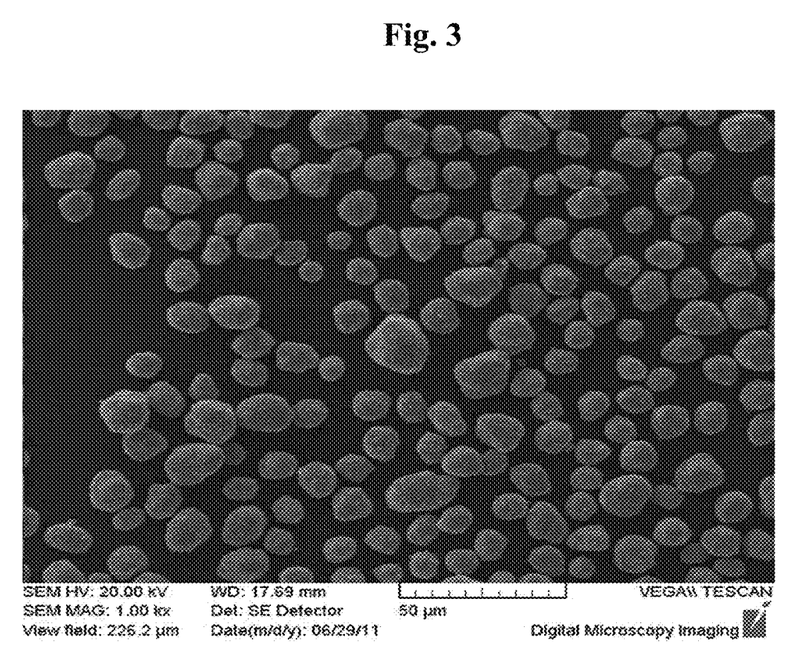
Figure 4:
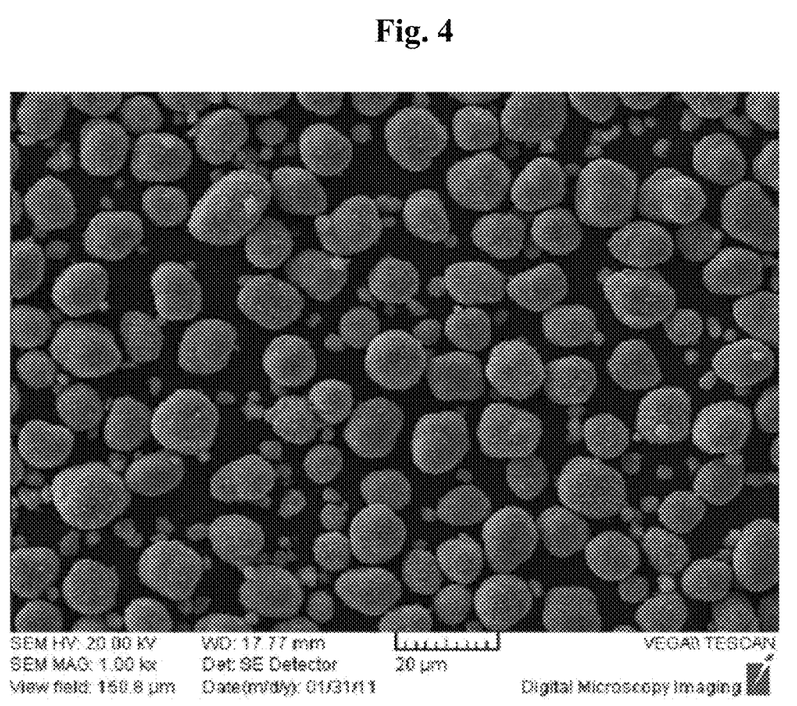
Figure 5:
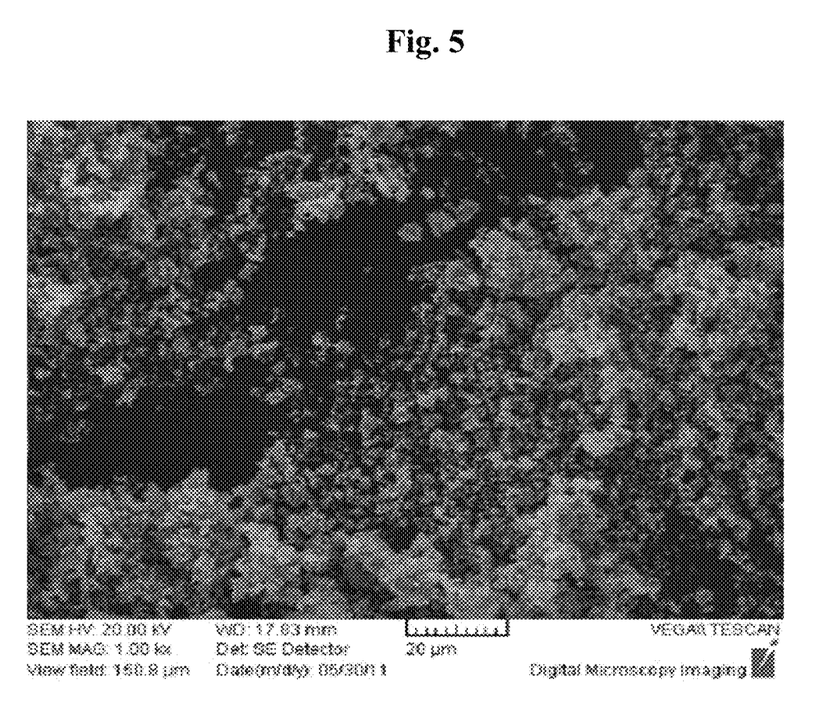

In order to analyze crystal structures of the lithium composite metal oxides manufactured in Examples 1 and 2 and Comparative Examples 1, powder XRD (X-Ray Diffraction) was conducted and the resulting graph was shown in FIG. 1. As the result of XRD analysis, it was confirmed that the lithium composite metal oxides of Examples 1 and 2 having a bi-layered structure had the same structure with the lithium composite metal oxide of the center part.

TEST EXAMPLE 2

SEM Measurement

In order to observe particle shape and surface of the lithium composite metal oxides manufactured in Examples 1 and 2 and Comparative Examples 1 and 2, the particles were observed by a scanning electron microscope (SEM), and the results were shown in FIGS. 2 to 5, respectively. It was confirmed that the particles of Examples 1 and 2 and Comparative Example 1 formed the spherical secondary particles of 1-12 μm, which were formed by aggregation of the small primary particles of 10~100 nm. Further, it was confirmed that the outer part material of Comparative Example 2 was not shown after coating in Examples 1 and 2. Accordingly, it was confirmed that the center part was completely coated with the outer part material.

TEST EXAMPLE 3

Battery Test (Coin Half Cell Test)

Figure 6:
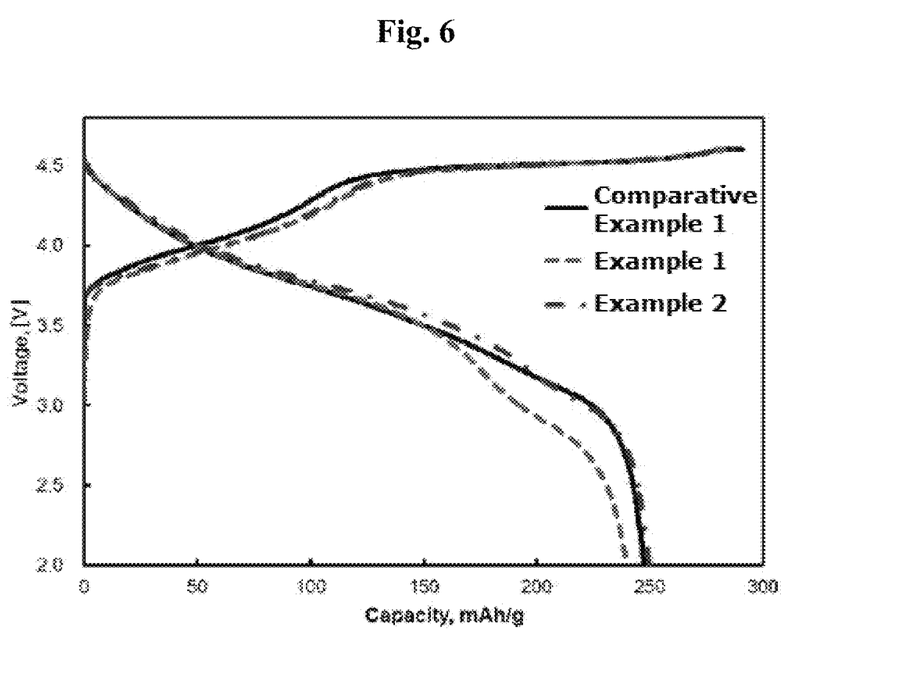
FIG. 6: a graph showing that initial discharge capacity and efficiency of the material of Example 2, which is manufactured by introducing hetero metals later shows higher capacity than the product of Comparative Example 1, which is manufactured by coprecipitation, but the material of Example 1 shows lower capacity.

The anode active materials synthesized in Examples 1 and 2 and Comparative Example 1 were mixed with carbon black and PVDF (Poly(vinylidene fluoride)) as a binder at a weight ratio of 94:3:3 in NMP as an organic solvent to obtain slurry. The slurry was coated on an Al foil of 20 um thick and then dried to obtain an anode. The anode, metal-lithium as a cathode and a porous polyethylene film (CellGard 2502) as a separator were assembled to obtain a CR2016 coin half-cell, and 1.1M LiPF6 EC/EMC/DEC solution was used as an electrolyte solution. The coin cells manufactured by the said method were subjected to a charge/discharge test at 0.1 C current density and 2.0 V~4.6 V. Their initial capacity and efficiency were listed in Table 1. As shown in FIG. 6, the cell using the material of Example 2, wherein hetero metal was introduced later showed higher initial discharge capacity and efficiency than the product of Comparative Example 1, which was manufactured by coprecipitation, but the cell using the material of Example 1 showed lower capacity. This means that the bi-layered structure formed by coating has lower capacity due to interfacial resistance of the center part and the outer part, but the interfacial resistance is removed by heat-treatment.

TABLE 1

|  |  | Comparative Example 1 | Example 1 | Example 2 |
|---|---|---|---|---|
| Charge Capacity | mAh/g | 291.0 | 287.1 | 287.4 |
| Discharge Capacity |  | 247.5 | 239.9 | 249.7 |
| Initial Efficiency | % | 81.5 | 83.6 | 86.9 |

TEST EXAMPLE 4

TEM Measurement

Figure 7:
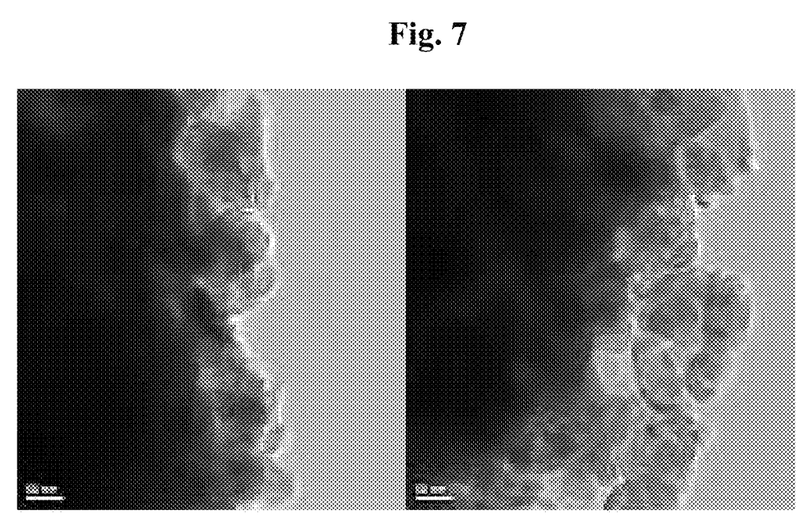
FIG. 7: TEM images of particles in order to observe shapes of the center part and the core part of all of the lithium composite metal oxide having a bi-layered structure manufactured in Example 2.

In order to observe shapes of the center part and the core part of all of the lithium composite metal oxides having the bi-layered structure, which was manufactured in Example 2, the particles were observed by using a transmission electron microscope (TEM), and the results was shown in FIG. 7. It was confirmed that the outer part material was coated on the center part to the thickness of 50~200 nm.

Industrial Applicability

The method for manufacturing an anode active material for a lithium secondary battery of the present invention and the anode active material for a lithium secondary battery manufactured thereby having a bi-layered concentration-gradient structure, in which the lithium concentration is gradually increased from the outmost part to the inside, has thermal stability and excellent lifespan as well as high capacity. Accordingly, it can be used for a large battery for electric vehicles and power storage systems as well as a small secondary battery.

While the invention has been described with respect to the above specific embodiments, it should be recognized that various modifications and changes may be made and also fall within the scope of the invention as defined by the claims that follow.

What is claimed is:

1. A method for manufacturing an anode active material for a lithium secondary battery comprising the following steps of:

a) simultaneously mixing a first metallic salt aqueous solution including nickel, cobalt, manganese and optionally a transition metal, a chelating agent, and a basic aqueous solution in a reactor, and mixing with a lithium raw material and calcining to manufacture a center part including the compound of following Chemical Formula 1:

$Li_{x1}[Ni_{1-y1-z1-w1}Co_{y1}Mn_{z1}M_{w1}]O_2$  Chemical Formula 1 wherein, $0.9 \leq x_1 \leq 1.3$, $0.1 \leq y_1 \leq 0.3$, $0.0 \leq z_1 \leq 0.3$, $0 \leq w_1 \leq 0.1$, and M is at least one metal selected from the group consisting of Mg, Zn, Ca, Sr, Cu, Zr, P, Fe, Al, Ga, In, Cr, Ge, and Sn;

b) simultaneously mixing a second metallic salt aqueous solution including nickel, cobalt, manganese and optionally a transition metal, the chelating agent, and the basic aqueous solution in a reactor, mixing with the lithium raw material and calcining, and grinding thereof to the size of nanometers to manufacture a compound for forming an outer part including the compound of following Chemical Formula 2:

$Li_{x2}[Ni_{1-y2-z2-w2}Co_{y2}Mn_{z2}M_{w2}]O_2$  Chemical Formula 2 wherein, $0.9 \leq x_2 \leq 1+z_2$, $0 \leq y_2 \leq 0.33$, $0 \leq z_2 \leq 0.5$, $0 \leq w_2 \leq 0.1$ and M is at least one metal selected from the group consisting of Mg, Zn, Ca, Sr, Cu, Zr, P, Fe, Al, Ga, In, Cr, Ge, and Sn;

c) mixing the center part manufactured from step a) and the compound for forming the outer part manufactured from step b) to form the outer part on the center part surface; and d) heat-treating the compound obtained from step c) at 500-800° C. to form a bi-layered structure in which lithium is present at a continuous concentration-gradient from the contact interface of the center part and the outer part to the surface part of the outer part.

2. The method for manufacturing an anode active material for a lithium secondary battery according to claim 1, wherein average particle diameter of the center part in step a) is 3 to 20 µm.

3. The method for manufacturing an anode active material for a lithium secondary battery according to claim 1, wherein average particle diameter of the compound for forming an outer part in step b) is 20 to 600 nm.

4. The method for manufacturing an anode active material for a lithium secondary battery according to claim 1, wherein the thickness of the outer part formed on the center part surface in steps c) and d) is 0.5 to 5 µm.

5. An anode active material for a lithium secondary battery manufactured by the method according to claim 1, wherein lithium is present at a continuous concentration-gradient from the contact interface of the center part and the outer part to the surface part of the outer part.

6. The anode active material for a lithium secondary battery manufactured by the method according to claim 1, wherein relation between D and P satisfies the following formula, when D is distance to a certain point in the outer part based on the surface part of the outer part, and P is concentration ratio of lithium to concentration of metal atoms at position D when D is changed from the surface part of the outer part to the contact interface of the center part and the outer part:

$P = aD + b;$

D = Distance to a certain point in the outer part based on the surface part of the outer part;
P = Concentration ratio of lithium to concentration of metal atoms at position D; and
$0.07 \leq a \leq 0.7$, $0.95 \leq b \leq 1.05$.

7. A lithium secondary battery using the anode active material for a lithium secondary battery according to claim 5.

* * * * *